United States Patent
Woodall et al.

(10) Patent No.: US 6,568,878 B2
(45) Date of Patent: May 27, 2003

(54) WAVE ENERGY DISSIPATER AND BEACH RENOURISHING SYSTEM

(75) Inventors: Robert Woodall, Panama City Beach, FL (US); Felipe Garcia, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 32 days.

(21) Appl. No.: 09/981,361

(22) Filed: Oct. 15, 2001

(65) Prior Publication Data

US 2003/0072615 A1 Apr. 17, 2003

(51) Int. Cl.[7] .............. E02B 3/04; E02B 9/00; E02B 9/08
(52) U.S. Cl. .............................. 405/25; 405/76
(58) Field of Search ................ 405/15, 23–25, 405/74–76, 195.1; 415/8, 906; 60/398; 290/53, 54, 42, 43

(56) References Cited

U.S. PATENT DOCUMENTS

| | | | | |
|---|---|---|---|---|
| 1,484,980 A | * | 2/1924 | Zottoli | 415/24 |
| 3,687,567 A | * | 8/1972 | Lininger | 415/7 |
| 3,846,990 A | * | 11/1974 | Bowley | 405/26 |
| 4,079,264 A | * | 3/1978 | Cohen | 290/55 |
| 4,184,805 A | * | 1/1980 | Arnold | 416/1 |
| 4,264,233 A | * | 4/1981 | McCambridge | 405/26 |
| 4,276,481 A | * | 6/1981 | Parker | 290/43 |
| 4,347,036 A | * | 8/1982 | Arnold | 416/1 |
| 4,712,944 A | * | 12/1987 | Rose | 405/26 |
| 4,804,855 A | * | 2/1989 | Obermeyer | 290/54 |
| 4,894,873 A | * | 1/1990 | Kiefer et al. | 4/497 |
| 5,136,174 A | * | 8/1992 | Simoni | 290/54 |
| 5,558,459 A | * | 9/1996 | Odenbach et al. | 405/21 |
| 5,700,108 A | * | 12/1997 | Bishop et al. | 405/26 |
| 5,879,105 A | * | 3/1999 | Bishop et al. | 405/26 |
| 5,947,678 A | * | 9/1999 | Bergstein | 415/3.1 |
| 6,006,518 A | * | 12/1999 | Geary | 60/398 |
| 6,153,944 A | * | 11/2000 | Clark | 290/54 |

* cited by examiner

*Primary Examiner*—Thomas B. Will
*Assistant Examiner*—Tara L. Mayo
(74) *Attorney, Agent, or Firm*—Harvey A. Gilbert; Donald G. Peck (57) ABSTRACT

A system converts energy of waves into rotational energy, friction, heat, hydrodynamic lift, and drag to extract energy from waves to reduce their amplitudes and increase their periods to reduce destructive effects on shorelines. This also allows sand to move toward land while capturing and depositing land-ward sand and particulate matter from eroding away from the beach. A plurality of cylindrical-shaped turbines or hydro-foils are stacked in water to rotate in response to energy from waves to dissipate wave energy and renourish beaches and shorelines with sand and other particulate matter. Rounded bearing surfaces are in contact with one another for frictionally engaging one another, and a pair of elongate anchoring members embedded in the sea floor hold the turbines or hydro-foils above the sea floor in an aligned stacked relationship via end portions to assure their frictional engagement.

20 Claims, 7 Drawing Sheets

WAVE ENERGY DISSIPATER AND BEACH RENOURISHING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a system to reduce energy of waves from reaching shoreline and maritime structures. More particularly, this invention reduces energy of waves and erosion of sand into deeper water while simultaneously accumulating current-carried sand on the beach.

Throughout the world numerous structures and facilities are located along the coasts for a wide variety of commercial and military uses. In the waters off-shore untold numbers of piling supported oilrigs, platforms and anchoring posts-provide operational structures for diverse tasks. Many military and civilian ships, docks, homes and related facilities are found along the shorelines in harbors, along streams and along inland rivers. A major cause of structural failure and damage associated with these locations is due to moving water and the tremendous hydrodynamic forces and impact that moving waves impart.

Erosion of beaches and shoreline by pounding surf and scouring action of tides also compound the problem. A large beach can act as a breaker to reduce the energy of a wave as it travels toward shore, and it can protect shoreline structures from large waves. However, the relentless erosive action of waves and tides will eventually strip-away even these relatively large expanses.

The wearing of shorelines by waves and erosion has been a problem as long as man has lived and worked near them. More recently technological advancements have attempted to help solve this age old problem. One recent effort disclosed in U.S. Pat. No. 5,558,459 is entitled "Wave Suppression Means for Large Waves." This patented device acts as a "water wheel" at the water-air interface to convert forward wave motion into rotational energy. It requires a pressure differential and can only work at the water/air boundary at the surface of a body of water where it is partially filled with water to achieve a desired state of buoyancy. The '459 device suppresses wave energy by limited turbulence at the water surface and reflection of waves in opposition of motion. The reflection of waves while being anchored by a chain will cause an array of these devices to bow land-ward and create tremendous stresses upon the anchoring means. Consequently, the size of waves may be limited that can be diminished prior to structural failure. There appears to be no blades that are capable of inducing a spin differential in an area where no pressure gradient exists and there does not appear lit to be use made of any frictional means to dissipate wave energy. The '459 device will not scoop or collect and deposit sand from flowing currents to build a beach i. e. is incapable of collecting sand and placing it shoreward of its anchoring, and the device apparently is not intended for use in a vertical array below the water.

Other devices are disclosed in U.S. Pat. Nos. 4,894,873 and 4,712,944 and have many of the same features as discussed with respect to '459. These devices appear to operate on the surface of the water, and '873 is built without an end cap to support the vanes and tend to keep them from bending in conditions of higher flow rates.

The water wheel of U.S. Pat. No. 5,947,678, entitled "Water Wheel With Cylindrical Blades," is housed inside of a cylinder that makes use of a large collection tube to channel flow to the blades. This '678 device is intended for power generation in a continuously flowing stream, and the curvature of the blades increases the blade surface area and does not appear to induce spin in a uniform pressure gradient state nor collect or deposit sand to offset the effects of erosion.

U.S. Pat. No. 5,700,108 discloses a "Dynamic Reef, Method of Use, and Shoreline Erosion Control System Employing Same. " This reef makes use of one anchoring point, is set in a vertical orientation and allowed to spin in the current flow. Although numerous moving parts and linkages are disclosed, it apparently has no frictional elements designed to dissipate energy. Under high wave and current flow conditions, this device will tend to sway and may move out of the way of the current so that the faster the current moves, the more this device is pushed out of the way and possibly made less effective. This device has no means for catching and depositing sand in a preferred land-ward orientation. Other devices are disclosed in U.S. Pat. Nos. 4,264,233 and 3,976,396, are anchored at one point, have small fin areas to limit response to flow, and have features as discussed with respect to '108.

Another floating barrier is disclosed in U.S. Pat. No. 3,846,990 and is entitled "Floating Wave Barrier". This device makes no use of rotating to convert to rotational energy, and since it is anchored at a single point, it might be moved aside by significant currents. It appears to have no means for the collection of eroding sand.

The structure of U.S. Pat. No. 4,276,481, entitled "Fluid Velocity Actuated Structure For a Wind Mill/Water Wheel" is used to convert rotational force into electrical power. Numerous moving parts and hinged movable cups of the structure appear to be less efficient, and when it is used at the surface of water, it is not capable nor intended to catch sand and place it in a preferred land ward deposit.

Thus, in accordance with this inventive concept, a need has been recognized in the state of the art for a system to effectively dissipate energy from waves and deposit sand land-ward to stop erosion and renourish the shoreline with deposited sand.

OBJECTS AND SUMMARY OF THE INVENTION

An object of the invention is to provide a system to dissipate wave energy.

Another object of the invention is to provide a system to deposit sand land-ward to stop erosion of shorelines.

Another object of the invention is to provide a system to renourish shorelines and beaches with sand deposits.

Another object of the invention is to provide a system to allow conversion of wave energy into rotational energy, friction, heat and drag to extract energy from waves to reduce their amplitudes and increase their periods to reduce destructive effects on shorelines.

Another object of the invention is to provide a system to allow sand to move toward land while capturing and depositing land-ward sand and particulate matter from eroding away from the beach.

Another object of the invention is to provide a system to dissipate wave energy and deposit sand to stop erosion and renourish the shoreline that is modular and scalable to adapt to different shorelines.

Another object of the invention is to provide a system to dissipate wave energy and deposit sand to stop erosion and renourish the shoreline using stacked cusp impeller turbines held between two embedded elongate anchorings.

Another object of the invention is to provide a system to convert wave energy into rotational energy, friction, heat, lift, and drag to extract energy from waves by mass loaded turbines and compressive loading thereof.

Another object of the invention is to provide a system capable of increasing conversion of wave energy into rotational energy, friction, lift, heat, and drag to extract energy from waves by increasing mass loading and compressive loading.

Another object of the invention is to provide a system of stacked turbines relying on vertical pressure differentials in waves to convert wave energy into rotational energy, friction, heat, lift, and drag.

These and other objects of the invention will become more readily apparent from the ensuing specification when taken in conjunction with the appended claims.

Accordingly, the system dissipates wave energy and renourishes beaches and shorelines with sand and other particulate matter. A plurality of cylindrical-shaped turbines or hydro-foils are stacked in water to rotate in response to energy from waves. A pair of anchoring members are embedded at one end in the sea floor and hold the turbines or hydro-foils above the sea floor in the aligned stacked relationship to frictionally engage channel elements with end portions of the turbines or hydro-foils and rounded bearing surfaces are in contact with one another for frictionally engaging one another in response to the energy of the waves.

DESCRIPTION OF THE PREFERRED EMBODIMENTS

Figure 1:
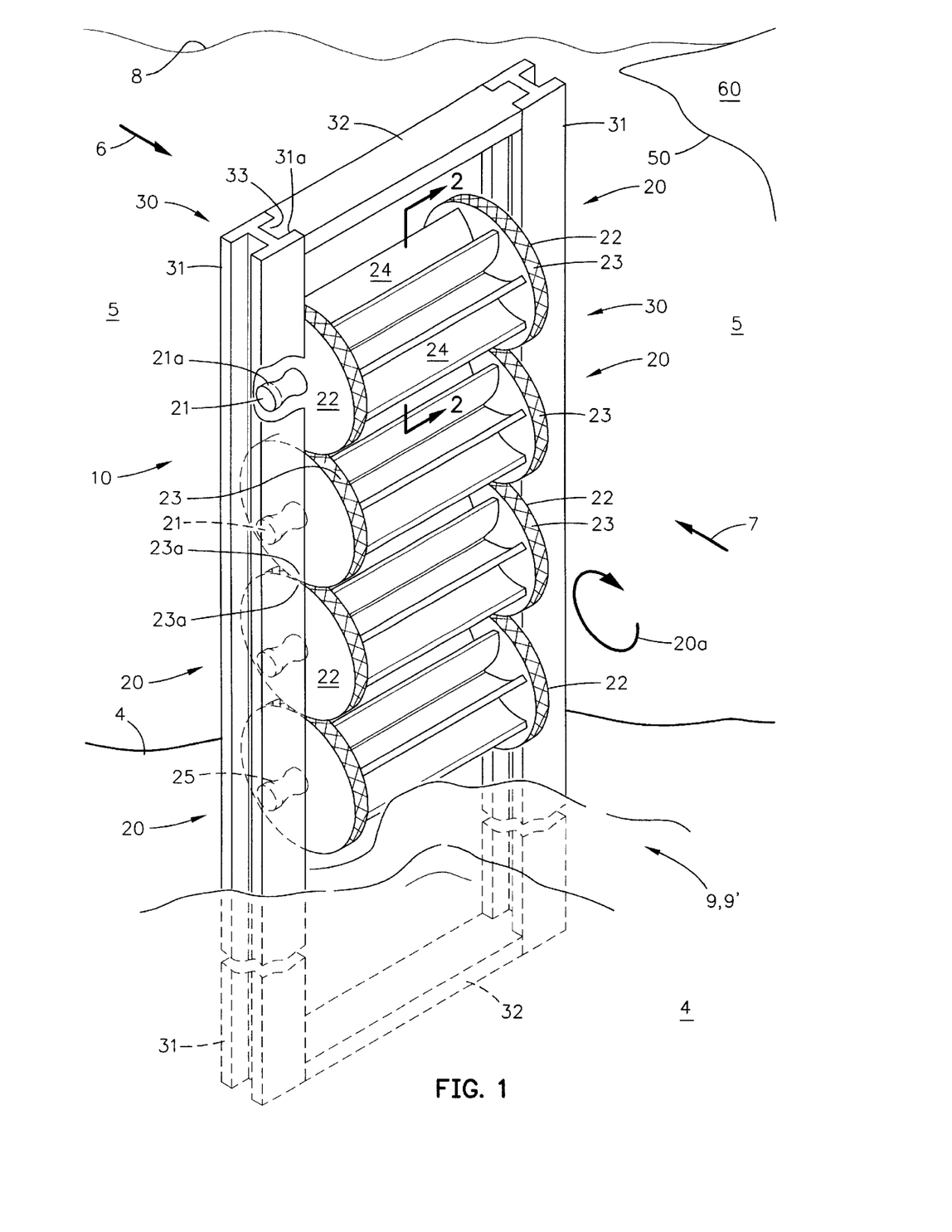
FIG. 1 is a isometric schematic view of the invention for dissipating wave energy and. renourishing beaches and shorelines.
Figure 2:
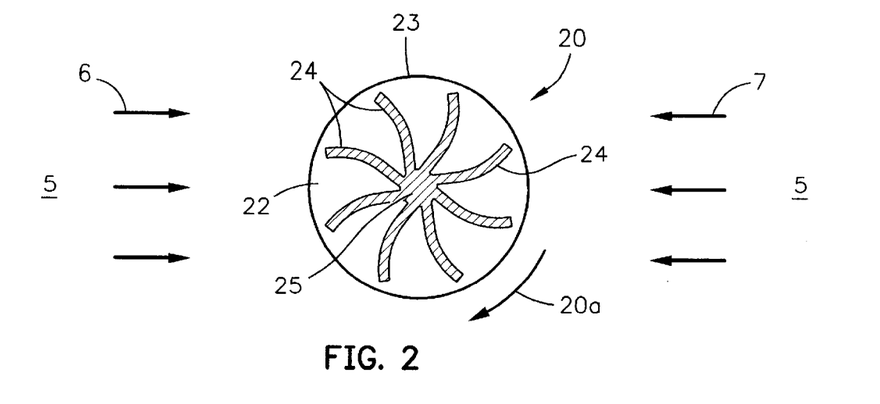
FIG. 2 is a cross-sectional view of a unitary turbine taken generally along line 2—2 in FIG. 1.

Referring to FIGS. 1 and 2, energy dissipation system 10 of this invention has a plurality of essentially cylindrically-shaped unitary turbines 20 oriented, or aligned in an upright relationship that is most likely to be a vertically extending stack of turbines 20 between two anchorings 30 in water 5. In this embodiment, anchorings 30 are two heavy-duty I-beams 31 connected to stiffeners 32 that are jetted or driven a substantial length to be embedded in sea floor 4 to securely hold system 10 extending across incoming waves 6 and outgoing flow 7 of water 5. Inwardly facing channels 33 of I-beams 31 receive rounded end portions 21 of each turbine 20. Rounded end portions 21 are sized to frictionally engage wall surfaces 31a of channels 33 to permit frictional engagement of end portions 22 as they rotate with each turbine 20 and to hold turbines 20 in their stacked aligned relationship that may extend between surface 8 of water 5 and sea floor 4. The frictional engagement and rotation of rounded end portions 21 on wall surfaces 31a defining channels 33 partially dissipates energy of impinging waves 6.

Each of turbines 20 is negatively buoyant and can be made from a rugged and strong material such as high density polyethylene (HDPE) and may or may not have fiber or other materials for reinforcement and increasing mass. Casting turbines 20 from HDPE or a variety of other suitable moldable materials is one method of fabrication that can contribute to the cost-effectiveness of system 10. The mass of turbines 20 can be selectably increased by making them solid, adding weights, or making them from heavier materials. When the mass of turbines 20 is increased, the ability to frictionally dissipate energy of waves 6 is increased.

Each turbine 20 has a pair of rounded end portions 21 at opposite ends next to disc-shaped end members 22. Optionally, each of rounded end portions 21 may be provided with roughened or auxiliary bearing surfaces 21a to increase drag and dissipate part of the energy of waves as end portions 21 rotate and frictionally engage walls 31a of I-beam 31. Auxiliary bearing surfaces 21a also can help control the possibility of eventual wear in channels 33; however, the lubricating effect of water 5 will tend to prevent undue wear.

Turbines 20 each have knurled frictional bearing surfaces 23 formed on the circumferential outside of disc-shaped end members 22, and adjacent ones of stacked turbines 20 touch along contacting, or adjacent areas 23a of bearing surfaces 23. The adjacent areas 23a of bearing surfaces 23 are disposed radially outwardly on turbine 20 and act as both roller bearing surfaces and frictionally interacting wearing surfaces between adjacent turbines 20. Frictionally interacting areas 23a of bearing surfaces 23 are changed along bearing surfaces 23 as adjacent turbines 20 are rotated, and the changing interacting areas 23a further dissipate part of the energy of waves 6 and outgoing flow 7 as turbines continue to rotate. The frictional interaction along areas 23a occurs as one or both of the adjacent turbines 20 drive the contacting interacting areas 23a in past each other or in opposite directions. Increasing the loading of mass of turbines 20 will increase the amount of energy of waves 6 that is dissipated, and one way to increase such mass is to add weight to turbines 20.

Each of turbines 20 has a plurality of elongate cusp-shaped vanes, or blades 24 that each extends between and is secured at opposite ends to disc-shaped end members 22. Elongate, curved cusp-shaped vanes 24 extend outwardly in a curved cross-sectional shape from an elongate core member 25 that extends to end portions 21. Vanes 24 and core 25 may be. solid or have hollow interiors that may be filled with heavier materials to increase mass and frictional loading.

In the arrangement of turbines 20 shown in FIGS. 1–4 and because of the curved shape of cusp-shaped vanes 24, the upper half of each turbine 20 catches more of incoming waves 6 of water 5 than the lower half of turbines 20. In addition, the energy of, or pressure exerted by waves 6 is higher toward surface 8 as compared the pressure exerted deeper in water 5. This vertical pressure differential exerted by waves 6 across turbines 20 causes turbines 20 to rotate in clock-wise direction 20a. Outgoing flow 7 of water 5, such as caused by outgoing tides is likely to be relatively uniform, although because of the orientation of vanes 24, some outgoing flow 7 may cause the lower half of each turbine 20 to catch more of outgoing flow 7 than the upper half of turbines 20. This flow condition also will cause turbines 20 to rotate in clock-wise direction 20a. In both flow conditions vanes 24 of turbines 20 will rotate turbines 20 to cause frictional engagement of rounded end portions 21 in channels 33 and frictional engagement of adjacent areas 23a of bearing surfaces 23 to dissipate energy from waves 6 and flow 7 or other phenomena associated with flowing water 5.

Since waves and other flowing water have three-dimensional natures of width, breadth, and depth and have different amplitudes and time periods of displacements of water, system 10 of this invention can be tuned accordingly to react to given flow levels or wave energies. This may be done by varying the masses and compressive loading on frictional elements, i. e. mass of turbines 20, and the loading borne by areas 23a of bearing surfaces 23 (and rounded end portions 21) can be increased or decreased as a situation calls for.

Figure 3:
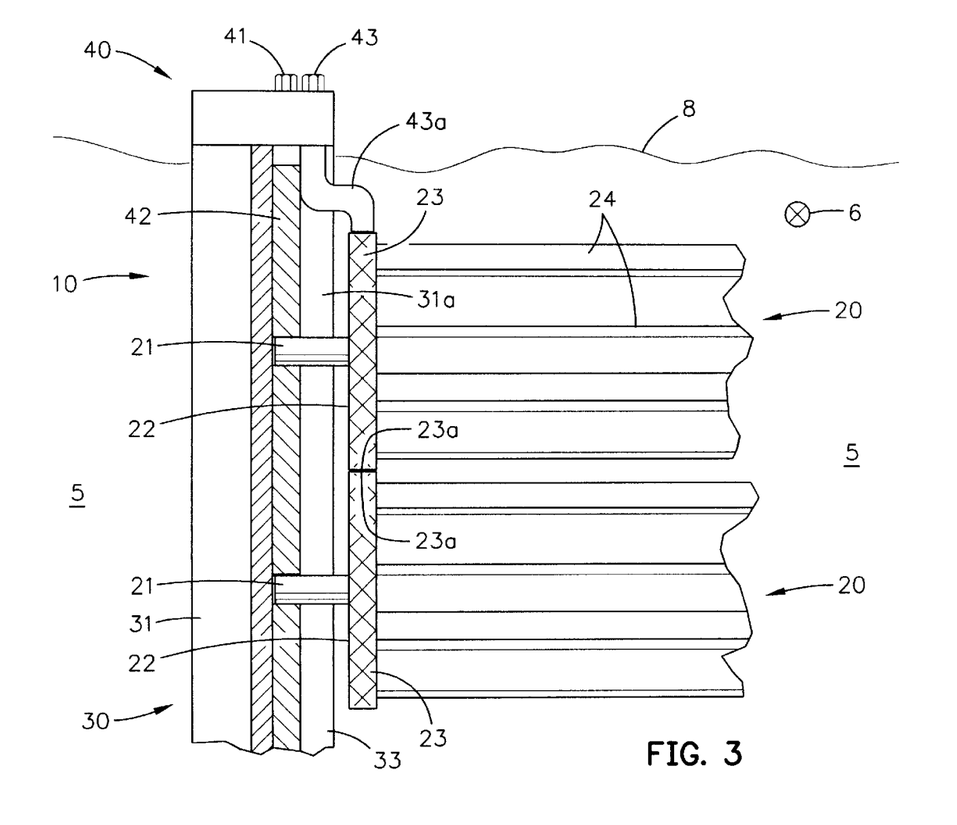
FIG. 3 shows a front view of an optional feature of the invention.

FIG. 3 shows an optional compressive loading structure 40 for system 10 to change the compressive, or frictional loading of rounded end portions 21 and areas 23a of knurled frictional bearing surfaces 23. This means for changing the loading gives a capability to change (increase or decrease) the dissipated energy of each turbine 20 and, consequently of system 10. Only one end of two turbines 20 is shown near surface 8 of water 5, it being clear that compressive loading structure 40 could be provided at both ends on many stacked turbines 20.

An exemplary compressive loading structure 40 can have an elongate bar 41 having an elongate cam-like portion 42 that longitudinally extends in channel 33 of I-beam 31 from above surface 8. When an operator rotates bar 41, cam-like portion 42 is brought to bear more forcefully on end portions 21 of turbines 20. This increased forceful bearing increases the frictional engagement of cam-like portion 42 and walls 31a with end portions 21 of turbines 20.

Loading structure 40 can also have a screw mechanism 43 having a lever arm 43a that can bear on bearing surface 23 of the upper turbine 20. Selectably tightening screw mechanism 43 will increase the compressive load on not only the upper turbine 20 that lever arm 43a of screw mechanism 43 contacts, and the increased compressive load also is transmitted to contacting areas 23a of bearing surfaces 23 of turbines 20 stacked beneath the top turbine 20. As a result, more energy can be expended and dissipated from incoming waves 6 of water 5 via increased frictional interaction of areas 23a.

As incoming waves 6 strike blades 24 of the top one-half of each turbine 20, it begins to turn. Turbines 20 of vertically extending system 10 will spin at different rates depending on the depth pressure differential of waves 6. That is to say, waves usually have more energy the closer they are to surface 8 and this energy progressively diminishes deeper in water 5. Consequently, each of the stacked turbines 20 is rotated a different amount by a different amount of wave force, or energy transmitted to it at different depths. Contacting areas 23a of the frictional surfaces 23 of the stacked turbines 20 can interact to create frictional forces that oppose motion, or dissipate part of the energy of waves 6. In addition, the rotational frictional interaction between rounded end portions 21 and walls 31a also contributes simultaneously to dissipate a part of the energy of waves 6. In this fashion energy of waves 6 is transformed into rotational energy for frictional interaction and dissipation as heat and hydrodynamic drag over time.

A wall of systems 10 can be made as modules to enable their rapid and effective placement across a shoreline 50 or beach 60 that is to be protected and/or built up. Systems 10 can be arranged side-by-side and embedded in sea floor 4 and/or numbers of such side-by-side arranged systems 10 can be layered in parallel rows if needed.

Referring to FIGS. 1–4, as incoming waves 6 of water 5 surge forward toward shoreline 50 they pick up and move sand toward beach 60. Stacked turbines 20 of system 10 are designed such that they allow sand caught-up, or entrained in the surge to move toward beach 60. Without a series of side-by side systems 10 in place, undercurrent in bottom region 9' tends to move sand particulate matter away from beach 60 toward the sea when the tide recedes. If this condition remains unchecked over years, shorelines 50 may be eroded-away severely and water might have an adverse effect on coastal construction. However, since system 10 has curved vanes 24 to catch this entrained sand particulate matter and let this matter go through turbines 20, it can and be dropped and deposited on the land-ward side, or outgoing side 20b of turbines 20. The sand particulate matter which has passed through system 10 falls to sea floor 4 and piles up adjacent the bottom turbine 20 of the stacked turbines 20. Eventually, the piled-up matter 9 in region 9' accumulates to such an extent as to block-off vanes 24 of the bottom turbine 20. Bottom turbine 20 may not be able to rotate so that the piled up matter 9 is further prevented from being washed out to sea by outgoing tides, for example. Further pile-up of sand particulate matter 9 may accumulate on sea floor 4 to a depth that may extend up several turbines 20. As particulate matter continues to build up on the land-ward sides of systems 10 arranged in a side-by-side barrier, beaches 60 will be built up. Systems 10 of stacked turbines 20 thereby effectively limit erosion and renourish beaches over time.

If build-up of sediment is undesirable, then the bottom-most turbine 20 (or turbines 20) may be removed from system 10. A spacer bar or other structural member (not shown) can be installed to keep turbine 20 that was next to the removed turbine 20 above sea floor 4. This permits sand particulate matter to continue erosion through bottom region 9 and out to sea.

Another option is to make top turbine 20 positively buoyant. This will enable it to float up and down and stay in contact with surface 8. This option will enable each system 10 to suppress surface wave effects that are not caused by large deep water displacements.

Figure 4:
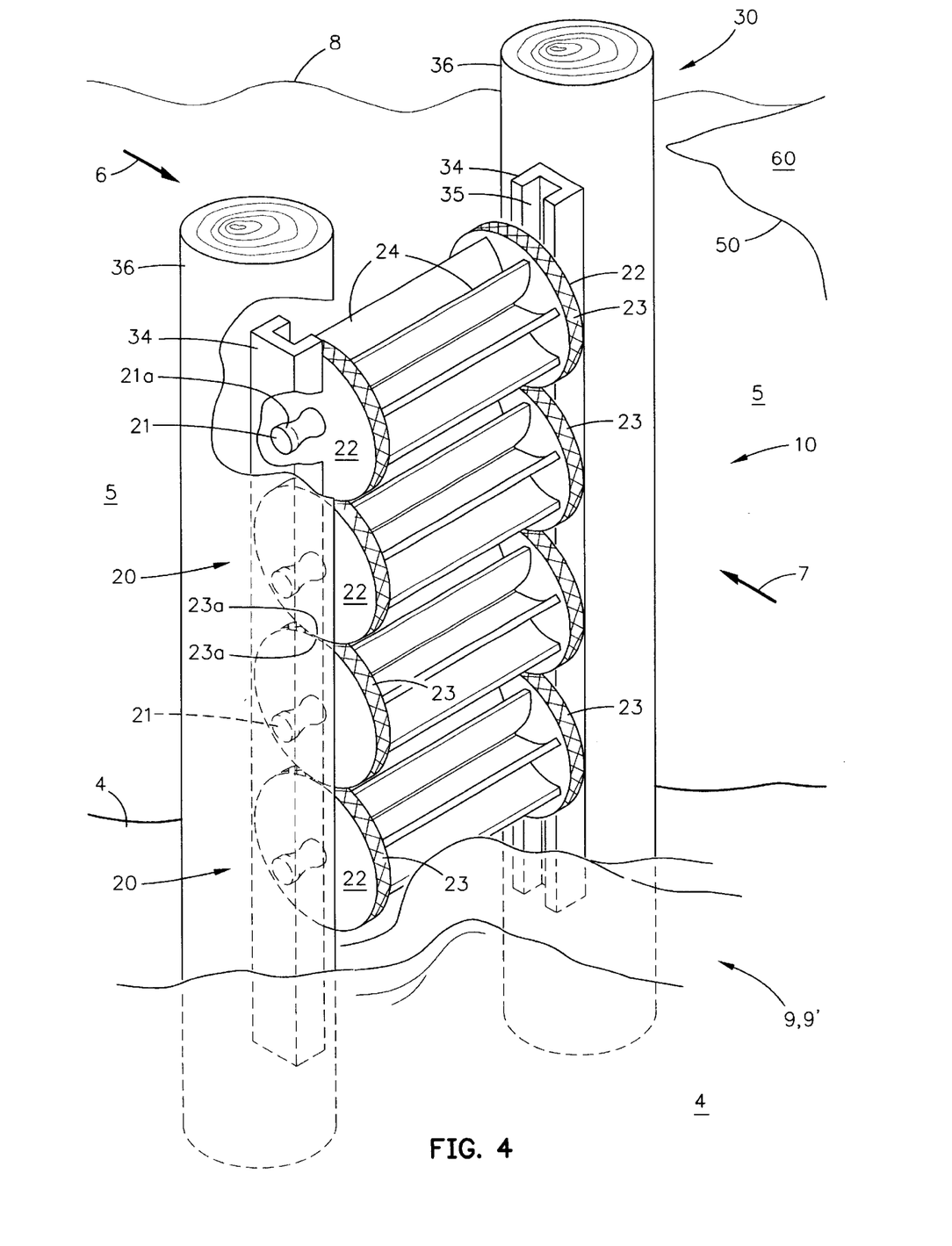
FIG. 4 is an isometric schematic view of another embodiment of the invention.

System 10 of FIG. 4 has elongate U-shaped channel members 34 secured to pilings 36. The channel members 34 and pilings 36 are jetted into or driven into sea floor 4 to hold stacked turbines in channels 35 in channel members 34 to work substantially the same as described above.

FIGS. 5, 6, 7, and 8 depict other embodiments in which energy dissipation system 10' of this invention has a plurality of essentially streamlined hydro-elements 20' each having a slit 20a' between adjacent hydro-elements 20'. Hydro-elements 20' are arranged in an upright, or vertically extending stack between two anchorings 30' in water 5. Slits 20a' allow flow of some of wave energy 6 through system 10'.

Figure 5:
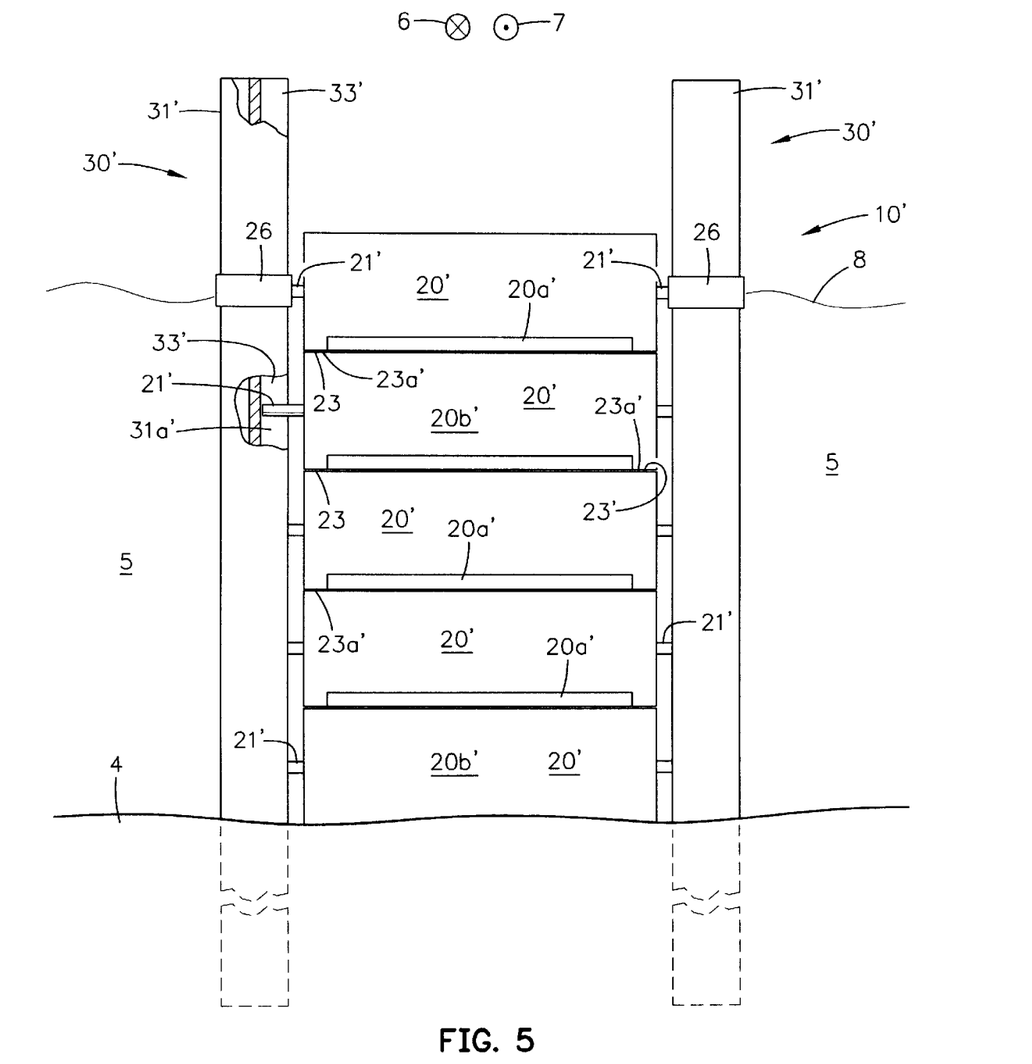
FIG. 5 shows yet another embodiment of the invention.

In the embodiment of FIG. 5, anchorings 30' are two heavy-duty I-beams 31' that are jetted or driven a substantial length to each have a portion embedded in sea floor 4. This securely holds system 10' in a position that extends across incoming waves 6 and outgoing flow 7 of water 5. Inwardly facing channels 33' of I-beams 31' receive rounded end portions 21' of each hydro-element 20'. Rounded end portions 21' are sized to frictionally engage wall surfaces 31a' of I-beam 31' and permit frictionally reduced rotation of each hydro-element 20'. Rounded portions 21' in channels 33' also hold hydro-elements 20' in their stacked aligned relationship that extends between surface 8 of water 5 and sea floor 4. The frictional engagement and rotation of rounded end portions 21' on wall surfaces 31a' defining channels 33' partially dissipates energy of impinging waves 6.

Like system 10, system 10' converts wave energy into rotational energy, friction, heat, lift, and drag to extract energy. It does this by inclusion of hydro-elements 20' that are hydrofoils each having a streamlined nose portion 20b' and tapering portion 20c'. The shape of streamlined nose portion 20b' and tapering portion 20c' may be essentially as shown in the drawings or may have a curved crosssectional shape, Hydro-elements 20' have an elongate core member 25' that extends to end portions 21', and the constituents of hydro-element 20' may be solid or have hollow interiors that may be filled with heavier materials to increase mass and frictional loading for dissipation of energy.

The breadth of each nose portion 20b' and tapering portion 20c' is such as to extend between I-beams 31'. Hydro elements 20' are negatively buoyant and, like elements of system 10 can be cast from a rugged and strong material like HDPE and may or may not have fiber or other materials for reinforcement and increasing mass. Making the mass of hydro-elements 20' greater increases, the frictional dissipation of energy of waves 6.

Hydro-elements 20' each have knurled rounded bearing surfaces 23' formed at the opposite ends of nose portion 20b'. Adjacent ones of stacked hydro-elements 20' touch along contacting, or adjacent frictionally interacting areas 23a' of knurled bearing surfaces 23'. The adjacent interacting areas 23a of bearing surfaces 23 are disposed radially outwardly on hydro-elements 20' and act as wearing surfaces that frictionally interact to dissipate part of energy from waves 6 between adjacent hydro-elements 20'.

Figure 6:
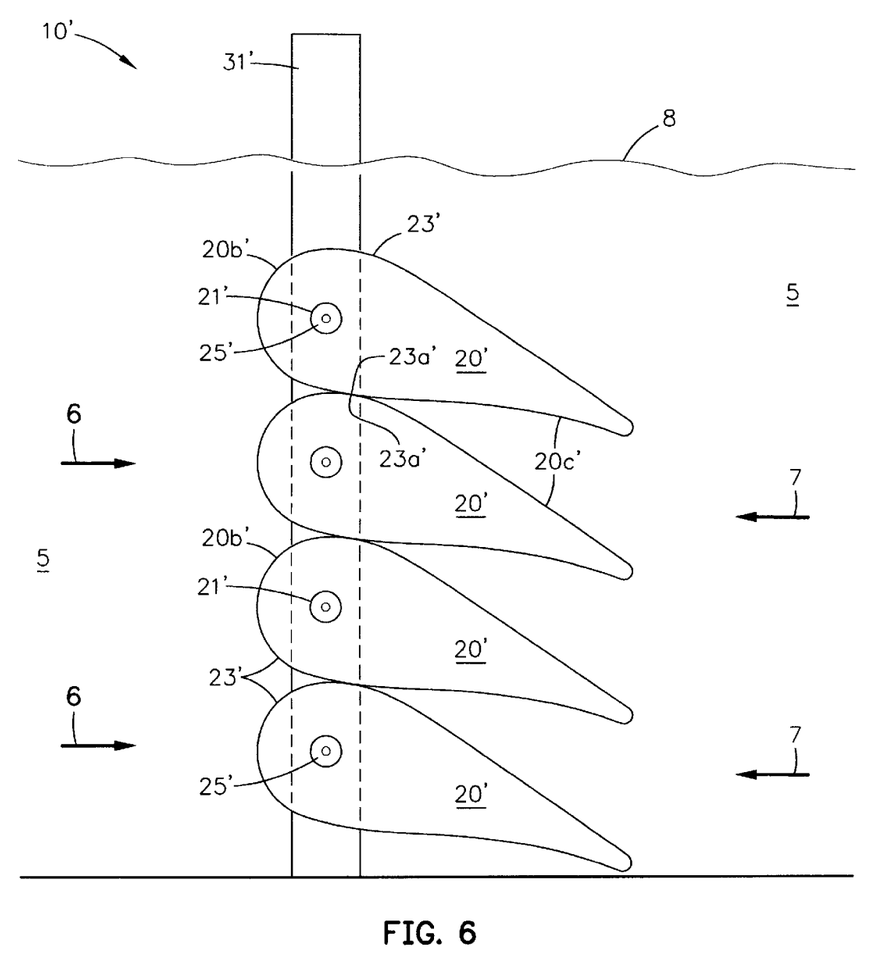
FIGS. 6 and 7 are cross-sectional side views along line 5—5 in FIG. 5 schematically showing water flow and effects thereof.
Figure 7:
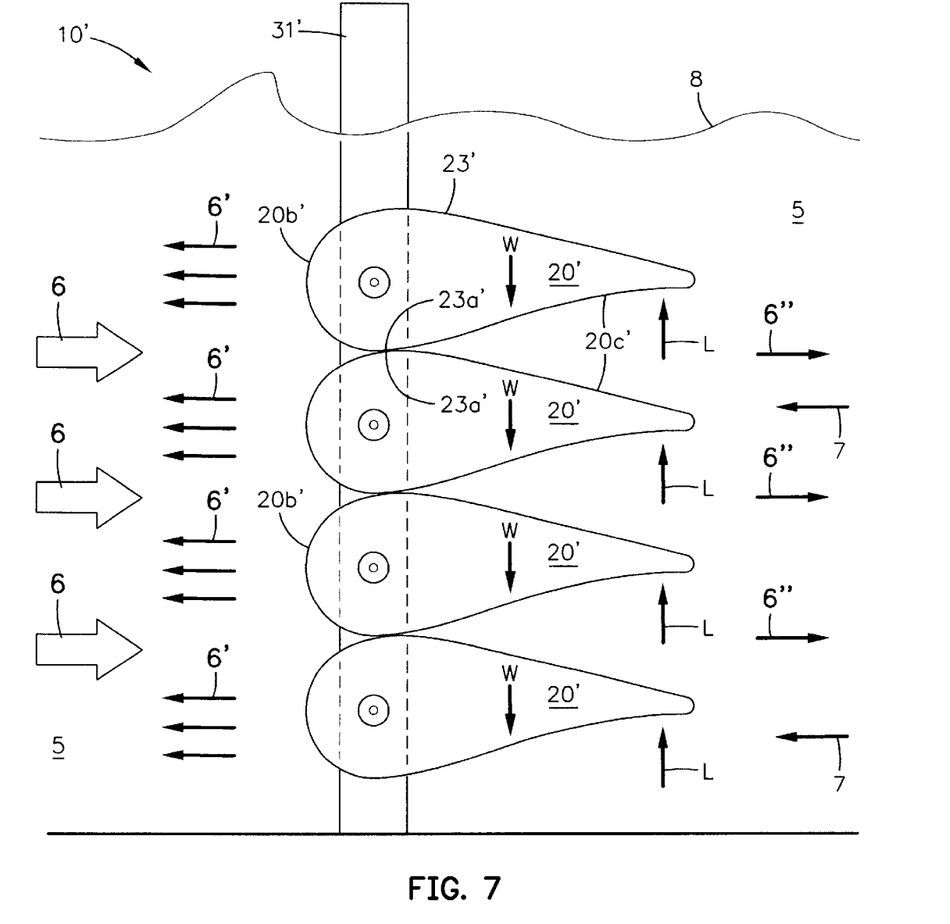

Referring also to FIGS. 6 and 7, the upper half of each hydro-element 20' is subjected to more flow, or more energetic flow of water 5 of incoming waves 6 traveling from left to right than the lower half of hydro-elements 20'. In other words, the energy, or pressure exerted of waves 6 is higher toward surface 8 as compared the pressure exerted deeper in water 5, and hydro-elements 20' will lift-up (begin to rotate) at different rates to convert energy of waves 6 into hydrodynamic lift and drag. This vertical pressure differential exerted by waves 6 across each of hydro-elements 20' causes hydro-elements 20' to lift-up and rotate in counter-clockwise direction 20'. This rotation will cause frictional engagement of rounded end portions 21' in channels 33' and frictional engagement of adjacent knurled bearing surfaces 23' of adjacent hydro-elements 20' to dissipate energy from waves 6. In other words, energy is dissipated by work used to lift hydro-elements 20', torsion associated with end portions 21' and friction as described.

System 10' can be tuned to react to given flow levels or wave energies by varying the masses and compressive loading on frictional elements, i. e. mass of hydro-elements 20', and the loads borne by areas 23a' of bearing surfaces 23' can be increased or decreased as a situation calls for. The optional compressive loading structure 40 of FIG. 3 can be modified for system 10' to change the compressive, or frictional loading of rounded end portions 21' and knurled frictional bearing surfaces 23'. This changed loading gives a capability to change (increase or decrease) the dissipated energy of system 10'.

Incoming waves 6 strike nose portions 20b' and tapering portions blades 20c' of each hydro-element 20'. First portions 6' of waves 6 are reflected from nose portions 20b'. Second portions 6' of waves 6 flow over and past nose portions 20b' and trailing portions 20c' and generate lift L that overcomes weight W of each hydro-element 20' to turn each hydro-element 20' counter-clockwise. Hydro-elements 20' of the vertically stacked system 10' begin to be rotated at different rates depending on the pressure differential which is a function of depth in waves 6. In other words, waves 6 have more energy the closer they are to surface 8 and this energy progressively diminishes deeper in water 5. Consequently, each of the stacked hydro-elements 20' is lifted/rotated a different amount by a different amount of wave force transmitted to it at different depths. The rubbing contact between knurled frictional surfaces 23' of adjacent ones of the stacked hydro-elements 20' interact with opposing frictional forces that oppose motion, or dissipate part of the energy of waves 6. In addition, rotational frictional interaction between rounded end portions 21' and walls 31a' also contributes to simultaneous dissipation of energy of waves 6.

Like system 10, a wall of systems 10' or layers of walls of systems 10' can effectively reduce wave amplitude and increase the time period of waves 6.

FIG. 5 shows an upper hydro-element 20' held at surface 8 of water 5 by a pair of slide collars 26 that are connected to I-beams 31' and rounded portions 21' of upper hydroelement 20'. Upper hydro-element 20' will enable system 10' to suppress surface wave effects that are not caused by large deep water displacements. Another option is to make upper hydro-element 20' positively buoyant and have collars 26 loosely fitting on beams 31' to help upper hydro-element 20' float up and down and stay in contact with surface 8.

Figure 8:
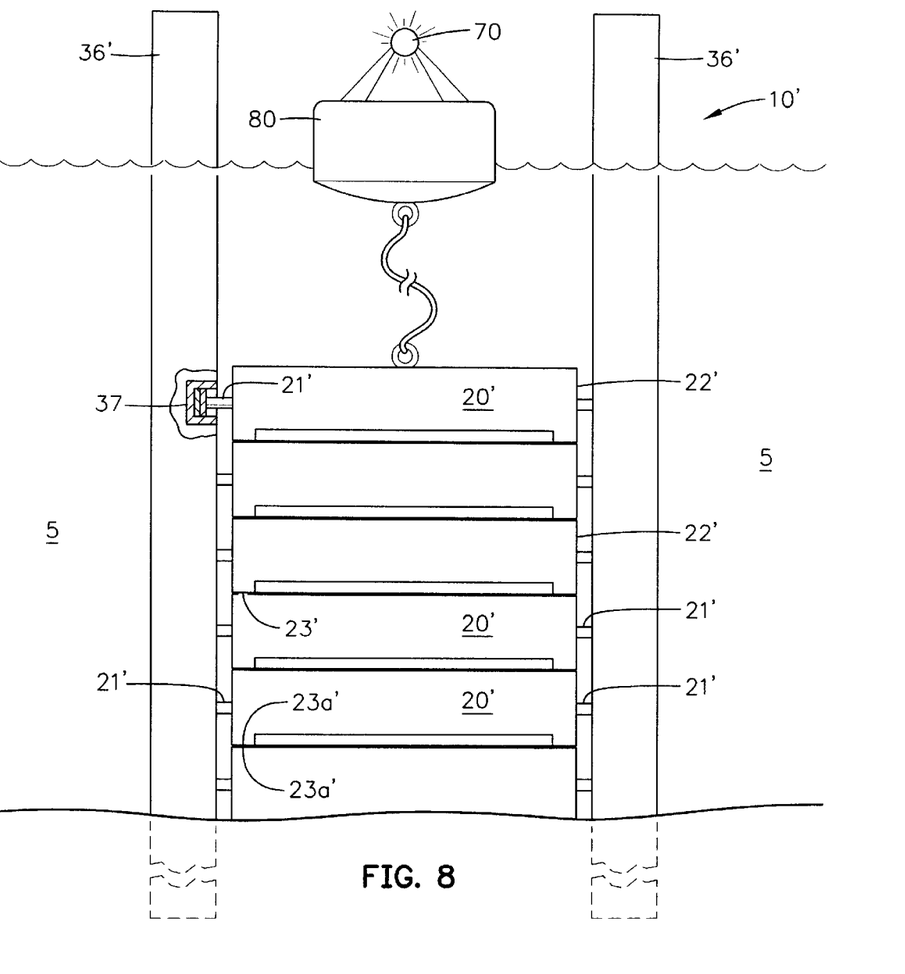
FIG. 8 shows still another embodiment of the invention.
Figure 9:
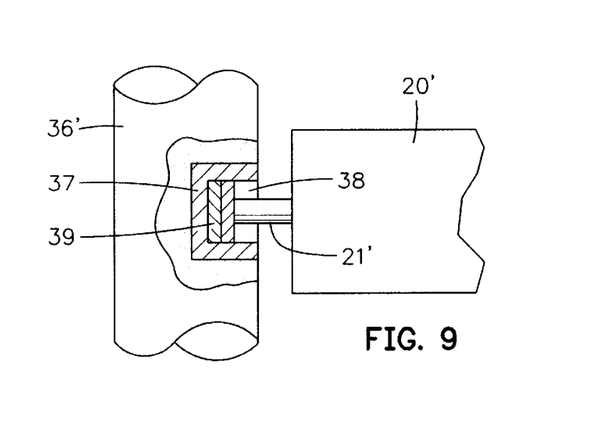
FIG. 9 shows details of features of FIG. 8.

FIGS. 8 and 9 show system 10' having hydro-elements 20' secured via rounded portions 21' in flange structures 37 to pilings 36'. Pilings 36' have portions embedded in sea floor 4 to hold stacked hydroelements 20'. Flange structures 37 are provided with recesses 38 that are sized and shaped to be small enough to receive end portions 21' and frictionally interact with end portions 21' to dissipate energy from waves 6. Torsion bar and/or friction clutch structure 39 optionally may 14 be included in flange structures 37 and bores 38 to help dissipate energy. A warning light 70 on float 80 could be tethered to system 10' for safety.

Systems 10 and 10' of this invention allow for conversion of wave energy into rotational energy, friction, heat, lift, and drag to extract energy from waves 6. Systems 10 and 10' of this invention additionally reduce the amplitudes and increase the periods of waves 6 to reduce destructive effects on coastal areas. Systems 10 and 10' of this invention additionally allow sand to move toward land while capturing and depositing sand particulate on its land-ward side to keep beaches from eroding away. Systems 10 and 10' of the invention have reduced complexity and constituents to assure reliable operation, and may be fabricated in a modular forms to expedite its timely deployment. The modular forms of systems 10 and 10' may be deployed in many different arrangements to stem erosion and protect beaches 50 and shorelines 60 from wave action and may be appropriately scaled.

Having the teachings of this invention in mind, modifications and alternate embodiments of systems 10 and 10' may be adapted. Its uncomplicated design lends itself to numerous modifications to permit its use in the hostile marine environment. Systems 10 and 10' not only can be made larger or smaller to work effectively, but they could be fabricated from a wide variety of materials to assure sufficient strength and long term reliable operation under adverse operational conditions. Turbines 20 including blades 24 and hydro-elements 20' could have different shapes, supporting structure could be differently designed than I-beams and channels with pilings, and compressive loading structure 40 can have different arrangements of different numbers of differently shaped structural members to engage turbines 20 and hydro-elements 20'.

The disclosed components and their arrangements as disclosed herein, all contribute to the novel features of this invention. Systems 10 and 10' are uncomplicated and cost-effective to be deployed and left in place for prolonged periods of time, and function reliably for the duration. Therefore, systems 10 and 10', as disclosed herein are not to be construed as limiting, but rather, are intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

We claim:

1. A system for reducing energy from waves comprising:

means for dissipating energy from waves in water by a plurality of members, each member having at least one vane structure to rotate in response to said waves, rounded bearing surfaces and rounded end portions, said members being arranged in a stacked relationship having said rounded bearing surfaces of adjacent stacked members being in contact with one another for frictionally engaging one another in response to said energy of said waves; and means for anchoring said energy dissipating means to the sea floor, said anchoring means having a pair of channel elements each embedded at one end in said sea floor and longitudinally extending from said sea floor to the surface of said water to align said members in said stacked relationship, and said channel elements and said end portions frictionally engaging one another.

2. The system of claim 1 wherein said rounded bearing surfaces are disposed radially outwardly from said vane structure and said frictionally engaging of said adjacent stacked members and said channel elements and said end portions is in response to said waves.

3. The system of claim 2 wherein each of said stacked members is a cast cylindrical-shaped turbine having a plurality of elongate cusp-shaped vanes extending from an elongate core between disc-shaped end members each mounting one of said rounded bearing surfaces.

4. The system of claim 3 wherein each of said cusp-shaped vanes extend outwardly in a curved cross-sectional shape from said elongate core extending to said end portions.

5. The system of claim 4 wherein each of said rounded bearing surfaces is knurled on its circumferential outside and adjacent ones of stacked turbines touch along frictionally interacting areas of said knurled bearing surfaces.

6. The system of claim 5 further comprising:

compressive loading structure mounted on each said channel element to selectably change frictional loading of said rounded end portions and said knurled bearing surfaces.

7. The system of claim 6 wherein said compressive loading structure includes cam structure and screw mechanism to respectively engage said rounded end portions and said knurled bearing surfaces.

8. The system of claim 7 wherein said anchoring means is a pair of I-beams each embedded at one end in said sea floor and each channel element of said anchoring means is part of each of said I-beams.

9. The system of claim 7 wherein said anchoring means is a pair of pilings each embedded at one end in said sea floor and each channel element of said anchoring means is a U-shaped channel each mounted on a separate one of said pilings.

10. The system of claim 9 wherein said system allows sand to move toward land while capturing and depositing land-ward sand and particulate matter from eroding away.

11. The system of claim 10 wherein a plurality of systems are anchored in said sea floor in side-by-side relationships to form at least one layer of a barrier.

12. The system of claim 2 wherein each of said stacked members is a cast vane-shaped hydro-element separated from one another by a slit and extending between said rounded bearing surfaces.

13. The system of claim 12 wherein each said vane-shaped hydro-element is a hydro-foil having a rounded nose portion and tapered portion to provide laminar flow of water.

14. The system of claim 13 wherein each of said rounded bearing surfaces are knurled and adjacent ones of stacked hydro-elements touch along frictionally interacting areas of said knurled bearing surfaces.

15. The system of claim 14 further comprising:

compressive loading structure mounted on each channel element to selectably change frictional loading of said rounded end portions and said knurled bearing surfaces.

16. The system of claim 15 wherein said compressive loading structure includes cam-like structure and screw mechanism to respectively engage said rounded end portions and said knurled bearing surfaces.

17. The system of claim 16 further comprising:

slide collar structure engaging rounded portions of one of said hydro-elements to locate it at the water-air interface.

18. The system of claim 16 wherein said anchoring means is a pair of I-beams each embedded at one end in said sea floor and each channel element of said anchoring means is defined by structure of each of said I-beams.

19. The system of claim 16 wherein said anchoring means is a pair of pilings each embedded at one end in said sea floor and each channel element of said anchoring means is a U-shaped channel each mounted on a separate one of said pilings.

20. The system of claim 19 wherein a plurality of systems are anchored in said sea floor in side-by-side relationships to form at least one layer of a barrier.

* * * * *